(12) United States Patent
Rota

(10) Patent No.: US 8,911,025 B2
(45) Date of Patent: Dec. 16, 2014

(54) WHEEL HAVING AN INTERLOCKING TIRE AND RIM, AND A METHOD FOR PRODUCING THE SAME

(75) Inventor: Paola Rota, Modena (IT)

(73) Assignee: F.I.R. S.R.L., Modena (IT)

( * ) Notice: Subject to any disclaimer, the term of this patent is extended or adjusted under 35 U.S.C. 154(b) by 544 days.

(21) Appl. No.: 12/705,812

(22) Filed: Feb. 15, 2010

(65) Prior Publication Data

US 2010/0253133 A1 Oct. 7, 2010

(30) Foreign Application Priority Data

Apr. 2, 2009 (IT) .............................. MO2009A0082

(51) Int. Cl.
*A63C 17/22* (2006.01)
*B60C 7/10* (2006.01)

(52) U.S. Cl.
CPC ........................................ *B60C 7/10* (2013.01)
USPC .................... 301/5.306; 301/5.307; 152/379.3

(58) Field of Classification Search
CPC ........ B60C 7/24; B60C 2007/00; B60C 7/00; A63C 17/22; A63C 17/223
USPC ................................... 152/379.3, 380, 381.6; 301/5.306–5.307, 5.309
See application file for complete search history.

(56) References Cited

U.S. PATENT DOCUMENTS

| | | | | |
|---|---|---|---|---|
| 2,083,766 | A * | 6/1937 | Wittkopp | 152/379.3 |
| 2,241,686 | A * | 5/1941 | Ware | 301/5.7 |
| 2,262,714 | A * | 11/1941 | Ware | 301/5.307 |
| 6,482,140 | B1 * | 11/2002 | Takatsu | 492/31 |
| 2003/0168904 | A1 * | 9/2003 | Frigo et al. | 301/5.307 |
| 2004/0075331 | A1 * | 4/2004 | Black | 301/5.306 |
| 2007/0044273 | A1 | 3/2007 | Milbredt | |
| 2008/0179940 | A1 | 7/2008 | Hill et al. | |

FOREIGN PATENT DOCUMENTS

| | | |
|---|---|---|
| CA | 2261492 A1 | 7/2000 |
| GB | 190914783 A | 2/1910 |
| WO | 9804423 A | 2/1998 |
| WO | 2005102739 A | 11/2005 |

* cited by examiner

*Primary Examiner* — Jason Bellinger
(74) *Attorney, Agent, or Firm* — Pearne & Gordon LLP

(57) ABSTRACT

A wheel, in particular for mobile apparatus such as carriages or the like, having an interlocking tire and rim and including: a central hub defining an annular external surface; a tread, associated to the external surface of the hub; and anchoring elements extending from the annular external surface in order to constrain the tread to the hub; the anchoring elements including at least one groove for housing at least a first portion of the tread.

8 Claims, 2 Drawing Sheets

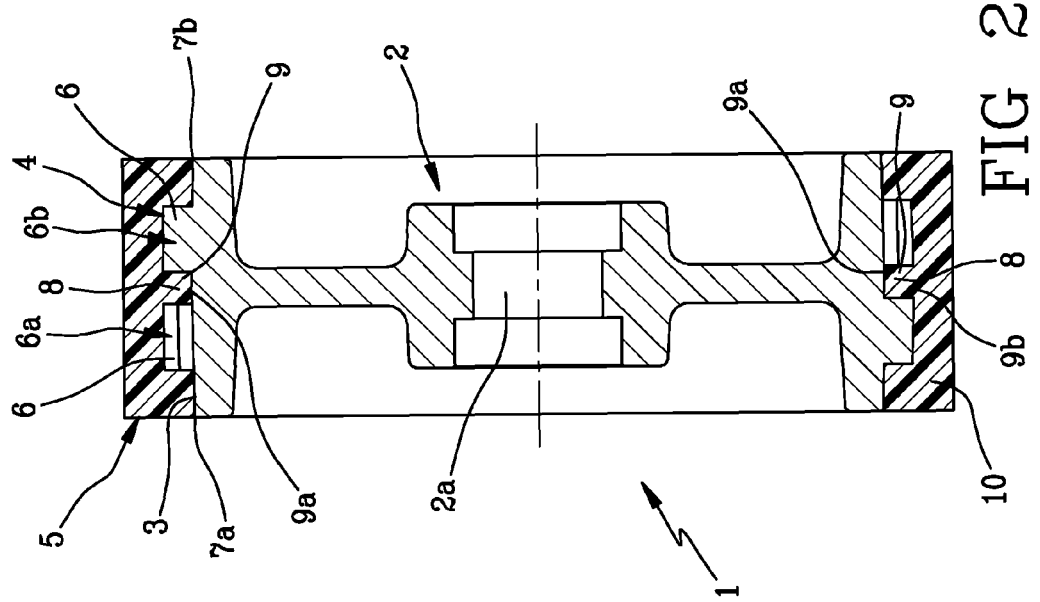
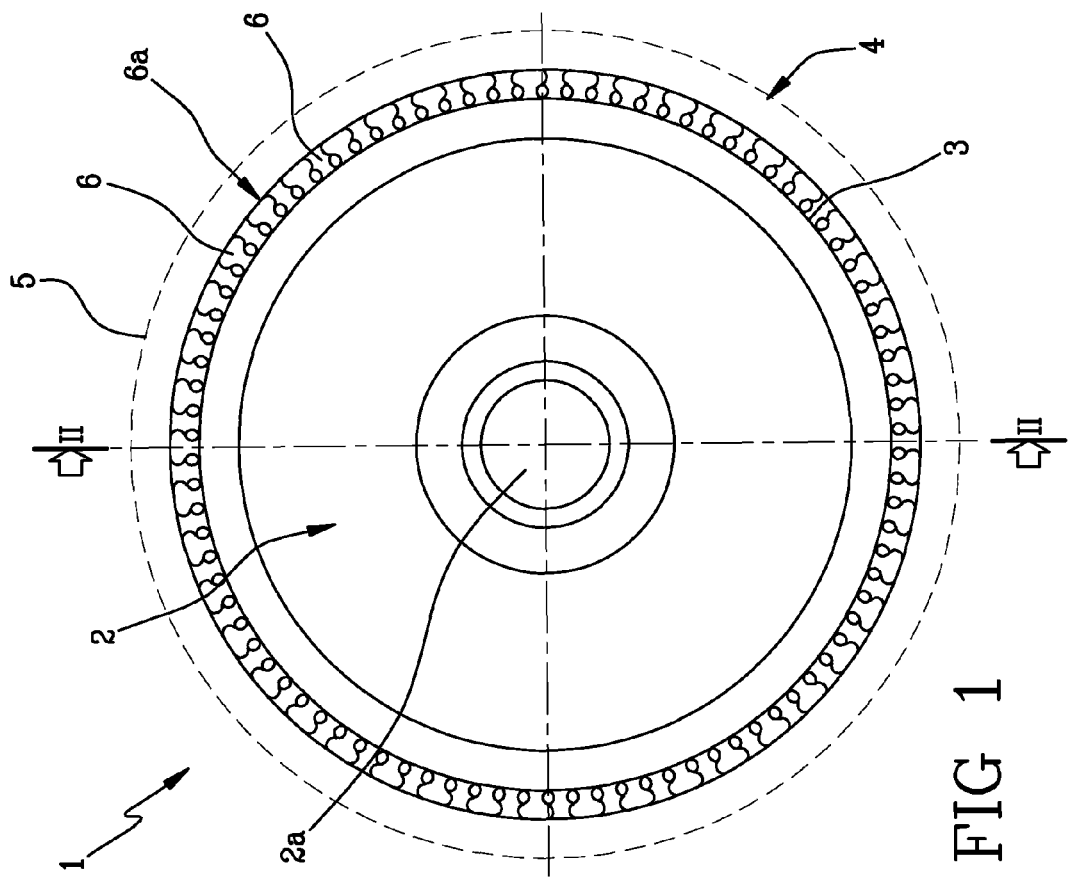

2

WHEEL HAVING AN INTERLOCKING TIRE AND RIM, AND A METHOD FOR PRODUCING THE SAME

BACKGROUND OF THE INVENTION

The invention relates to a wheel, in particular for mobile apparatus such as carriages or the like, and a method for realising the wheel.

In particular, the invention relates to a small wheel, generally used for mobile apparatus for domestic use, such as for example: floor-washers, vacuum cleaners, small carriages etc.

The wheels, which normally exhibit a minimum diameter of 200 mm, are constituted by a central hub and an external covering defining the tread of the wheel.

In greater detail, the hub is made of a thermoplastic material and has a substantially discoid shape. A scalloping develops on the annular external surface of the hub, destined to anchor the covering to the central hub.

The scalloping is constituted by a series of portions projecting radially from the external surface of the hub and developing at a central zone of the external surface.

The covering is made of a thermoplastic material, injection-moulded on the external surface of the hub.

The thermoplastic material, in a liquid state, is distributed on the external surface and about the scalloping, such as to be anchored to the externally-projecting portions.

At the end of the moulding stage, the solidified thermoplastic material is distributed over all the peripheral zone of the hub in order to define the tread of the wheel.

The above-described wheels, and the method for realising the wheels, exhibit however important drawbacks.

Firstly, the radially-projecting elements, though facilitating the anchoring of the tread to the wheel, constitute all the same an obstacle for the laying of the molten thermoplastic material.

The material injected on the external surface of the hub is obstructed by the scalloping which prevents a homogeneous distribution of the material over all the annular external surface of the hub.

Consequently a tread is realised which has a non-uniform conformation, provided with some zones having variable conformation and other zones having a variable thickness which lead to damaging vibrations during the rolling of the wheel.

In this context, the technical aim at the basis of the present invention is to provide a wheel for mobile apparatus such as carriages or the like and a method for realising the method, which obviates the drawbacks of the prior art as cited above.

In particular, an aim of the present invention is to provide a wheel having a tread that is well-anchored to the hub and homogeneously distributed over all of the external surface of the hub.

A further aim of the present invention is to provide a wheel and a method for realising the method which is able to facilitate the injection operations of the tread on the periphery of the wheel.

The set technical objective and the specified aims are substantially attained by a wheel, in particular for mobile apparatus such as carriages or the like, and by a method for realising the wheel comprising the technical characteristics set out in one or more of the accompanying claims.

BRIEF DESCRIPTION OF THE DRAWINGS

Further characteristics and advantages of the present invention will better emerge from the non-limiting description that follows of a preferred though not exclusive embodiment of a wheel and a method for realising the wheel, as illustrated in the accompanying figures of the drawings, in which:

FIG. 1 is a schematic view in lateral elevation of a wheel for mobile apparatus in agreement with the present invention;

FIG. 2 is a view in lateral section along the line II-II of the wheel of FIG. 1.

DESCRIPTION OF THE PREFERRED EMBODIMENTS

Figure 3:
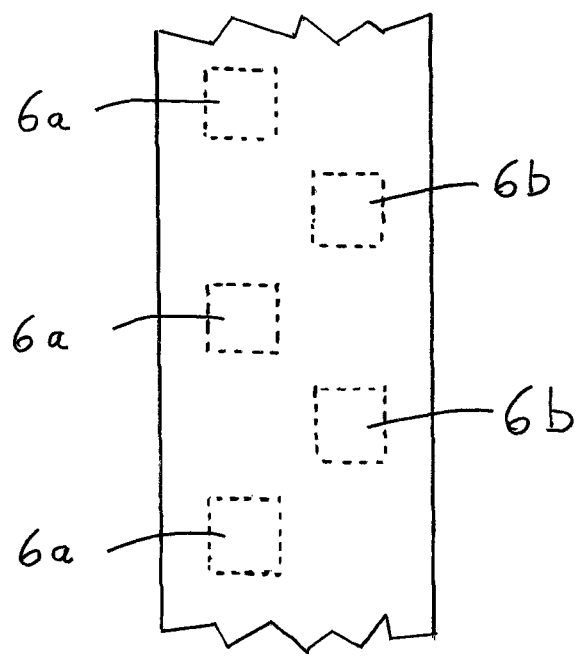
FIG. 3 is a schematic plan view of the elements 6 on the hub 2.

With reference to the figures of the drawings, 1 denotes in its entirety a wheel, in particular for self-propelling vehicles such as trucks or the like.

According to the present invention, the wheel 1 is advantageously used for self-propelling machines for domestic use, such as floor-washers, vacuum cleaners, trucks etc.

However, the wheel 1 of the present invention can be used as a support for any type of mobile apparatus or machine.

Advantageously the wheel 1 is of the type exhibiting a minimum diameter comprised between 190 and 210 mm, preferably 200 mm.

As better illustrated in the section view of FIG. 2, the wheel 1 comprises a central hub 2 having a substantially discoid conformation and provided with a central hole 2*a* destined to be keyed on a respective shaft (not illustrated in the accompanying figures as it is not a part of the present invention).

The hub 2 is advantageously made of a thermoplastic material, preferably polyamide, by means of injection moulding.

The hub 2 further defines, at a respective peripheral zone, an annular external surface 3 on which anchoring means 4 are housed.

In particular, the anchoring means 4 extend from the annular external surface 3 in order to constrain a tread 5, better described herein below in the present description, to the hub 2.

In greater detail, the anchoring means 4 comprise a plurality of elements 6 that radially project from the annular external surface 3 of the hub 2. The elements 6 extend along the whole circumferential development of the external surface 3 and are respectively staggered.

The projecting elements 6 are subdivided into a first and a second series 6*a*, 6*b*, respectively housed at a first and a second edge 7*a*, 7*b* of the external surface 3 (FIG. 2).

In this situation, the projecting elements 6 of the first series 6*a* are staggered and alternated with respect to the elements 6 of the second series 6*b*.

Further, the first series 6*a* is distanced from the first series 6*b* in order to define a housing groove 8.

In particular, as is better illustrated in FIG. 2, the groove 8 develops in the rotation direction of the wheel between the projecting elements 6, and exhibits a circumferential conformation.

Also worthy of note is the fact that the housing groove 8 is arranged at a central zone of the external surface 3 of the hub 2, interposed between the first and the second edge 7*a*, 7*b*.

The anchoring means 4 preferably define a single groove 8 having a minimum width comprised between 1.5 and 3 mm, advantageously 2 mm.

However, the arrangement of the projecting elements 6, as well as the distance between them and the thickness thereof, can be any, while realising a plurality of grooves 8, parallel to one another and having different widths.

As mentioned herein above, the anchoring means 4 are destined to constrain the tread 5 to the external surface 3 of the hub 2.

The tread 5 is advantageously made of polyurethane having a hardness comprised between 60 and 95 SHORE-A, and realised by injection moulding on the external surface 3 of the hub 2.

In particular, the tread 5 exhibits a respective first portion 9 having an annular development in order to be housed internally of the groove 8.

Still with reference to FIG. 2, note that the first portion 9 defines a lower surface 9a abutting the external surface 3 of the hub 2.

On the opposite side of the lower surface 9a an upper surface 9b develops from which an annular rolling element 10 of the tread 5 extends, which is destined to run and roll on the terrain.

The above-described wheel 1 is made by means of a method described herein below, also an object of the present invention.

Firstly the hub 2 is realised by injection moulding of a thermoplastic machine (polyamide). During the stage of realising the hub, the projecting elements 6 are also formed, in a single piece with the hub 3.

Then the tread 5 is constrained to the anchoring means 4, by inserting the first portion 9 into the housing groove 8 defined by the anchoring means 4.

In greater detail, an injection moulding is made of a molten thermoplastic material, preferably polyurethane, along the housing groove 8.

In this way, the molten thermoplastic material is distributed on the external surface 3, going to fill all the zones defined between the projecting elements 6 and above them.

The presence of the groove 8 advantageously enables the thermoplastic material to be distributed homogeneously on all the annular external surface 3 of the hub 2.

The groove 8, which develops circumferentially along the whole external surface 3, does not exhibit any obstructing element and allows a direct passage of the molten material.

The molten thermoplastic material injected directly into the groove 8 thus easily and quickly reaches any zone of the external surface 3.

Consequently a tread 5 is realised which is has a conformation and a width which are uniform and homogeneously distributed about the hub 2.

What is claimed:

1. A wheel, having an interlocking tire and rim, the wheel comprising:
   a central hub defining an annular external surface;
   a tread, associated to the external surface of the hub; and
   anchoring means extending from the annular external surface in order to constrain the tread to the hub;
   the anchoring means comprising at least one groove for housing at least a first portion of the tread, and a plurality of elements radially projecting from the annular external surface of the hub;
   the groove developing between the projecting elements and exhibiting a substantially circumferential development; a first series of projecting elements positioned adjacent to but spaced apart from a first edge of the external surface of the hub, and a second series of projecting elements, distanced from the first series and positioned adjacent to but spaced apart from a second edge of the external surface opposite the first edge; the groove being defined between the first series and the second series of projecting elements; the projecting elements of the first series being alternated with the projecting elements of the second series; the groove being arranged at a central zone of the external surface of the hub interposed between the first edge and the second edge; the first portion of the tread exhibiting an annular development such as to be housed in the groove; the first portion defining a lower surface abutting on the external surface of the hub, and an upper surface from which an annular rolling element of the tread develops; wherein the groove has a width of at least 1.5 mm, and wherein the hub is made of a thermoplastic material and in that the tread is made of polyurethane with a hardness comprised between 60 and 95 SHORE-A; the tread being injection-molded on the external surface of the hub, wherein the width of each of the first series of projecting elements is greater than the width of the groove, wherein each of the projecting elements of the second series has a shape, in lateral elevational view, wherein the projecting element has a first width where it attaches to the annular external surface of the hub, and as it extends radially from the hub, it narrows in width to define a second width which is narrower than the first width, then as it extends further radially from the hub, it broadens in width to define a third width which is greater than the second width, then again narrows in width as it radially approaches its distal end.

2. The wheel of claim 1, wherein the wheel exhibits a diameter comprised between 190 and 210 mm.

3. The wheel of claim 1, wherein the groove comprises a width of 2 mm.

4. The wheel of claim 1, wherein the wheel exhibits a diameter of 200 mm.

5. The wheel of claim 1, wherein the wheel exhibits a minimum diameter of 190 mm.

6. A wheel comprising:
   a central hub defining an annular external surface;
   a tread, associated to the external surface of the hub; and
   anchoring means extending from the annular external surface in order to constrain the tread to the hub;
   and further comprising a plurality of elements radially projecting from the annular external surface of the hub;
   a first groove for housing at least a first portion of the tread, and developing between the projecting elements and exhibiting a substantially circumferential development,
   wherein there is provided a first series of projecting elements positioned adjacent but spaced apart from a first edge of the external surface of the hub, and a second series of projecting elements, distanced from the first series and positioned adjacent but spaced apart from a second edge of the external surface opposite the first edge, in order to define the first groove, wherein the projecting elements of the first series are alternated with the projecting elements of the second series; the first groove being arranged at a central zone of the external surface of the hub interposed between the first edge and the second edge;
   wherein the tread is made entirely of a single piece of polyurethane formed by means of injection-molding on the external surface of the hub, distributing the polyurethane along the first groove, between the projecting elements and radially above them, wherein each of the projecting elements of the second series has a shape, in lateral elevational view, wherein the projecting element has a first width where it attaches to the annular external surface of the hub, and as it extends radially from the hub, it narrows in width to define a second width which is narrower than the first width, then as it extends further radially from the hub, it broadens in width to define a third width which is greater than the second width, then again narrows in width as it radially approaches its distal end.

7. A floor-washer wheel comprising:
a central hub defining an annular external surface;
a tread, associated to the external surface of the hub; and
anchoring means extending from the annular external surface in order to constrain the tread to the hub;
and further comprising a plurality of elements radially projecting from the annular external surface of the hub;
a first groove for housing at least a first portion of the tread, and developing between the projecting elements and exhibiting a substantially circumferential development,
wherein there is provided a first series of projecting elements positioned adjacent but spaced apart from a first edge of the external surface of the hub, and a second series of projecting elements, distanced from the first series and positioned adjacent but spaced apart from a second edge of the external surface opposite the first edge, in order to define the first groove, wherein the projecting elements of the first series are alternated with the projecting elements of the second series; the first groove being arranged at a central zone of the external surface of the hub interposed between the first edge and the second edge;
wherein the tread is made entirely of a single piece of polyurethane formed by means of injection-molding on the external surface of the hub, distributing the polyurethane along the first groove, between the projecting elements and radially above them; and
wherein the tread has a hardness comprised between 60 and 95 SHORE-A and the wheel exhibits a minimum diameter comprised between 190 and 210 mm, wherein each of the projecting elements of the second series has a shape, in lateral elevational view, wherein the projecting element has a first width where it attaches to the annular external surface of the hub, and as it extends radially from the hub, it narrows in width to define a second width which is narrower than the first width, then as it extends further radially from the hub, it broadens in width to define a third width which is greater than the second width, then again narrows in width as it radially approaches its distal end.

8. The wheel of claim 1, wherein the second series of projecting elements comprises 45 projecting elements.

\* \* \* \* \*